Patented Oct. 16, 1945

2,387,023

UNITED STATES PATENT OFFICE 2,387,023

PROCESS FOR THE RECOVERY OF RIBOFLAVIN

George E. Hines, Jr., Terre Haute, Ind., assignor to Commercial Solvents Corporation, Terre Haute, Ind., a corporation of Maryland No Drawing. Application June 10, 1944,
Serial No. 539,799

17 Claims. (Cl. 195—42)

My invention relates to a process for the recovery of riboflavin from solutions thereof. More particularly, it pertains to a method for recovering dissolved riboflavin by the action of bacteria on various nutritive media.

Riboflavin has been obtained in relatively concentrated solutions from numerous sources such as liver, yeast, and whey, as well as from certain fermented mashes, such as, for example, the residues obtained from butyl alcohol fermentations. In isolating riboflavin from these sources, it has been customary to filter slurries of these substances in order to obtain a clear solution, from which the riboflavin can be concentrated, by an adsorbent, such as fuller's earth, kieselguhr, kaolin, silica gel, hydrated aluminum silicate, etc. The riboflavin thus adsorbed is recovered from the resulting adsorbate by eluting with a suitable elution solvent.

In this connection, various solvents have been recommended as eluting agents. Among such materials are aqueous aldehydes and ketones, as well as alcoholic solutions of organic bases. However, such solvents have shown numerous disadvantages. For example, pyridine or methanol solutions thereof are undesirable from the standpoint of cost and odor. Most of the elution solvents employed also possess the common disadvantage of extracting from the adsorbate relatively large quantities of impurities, as well as the riboflavin itself.

I have now discovered that precipitates rich in a substance which is readily converted into riboflavin can be recovered from various nutrient riboflavin-containing solutions, or mixtures containing the same, by the action of certain types of bacteria thereon. This precipitate is normally reddish-brown in color and, on being exposed to the atmosphere in the presence of moisture, assumes a dark green color on the surface thereof. Under the conditions provided by such a fermentation the dissolved riboflavin is converted to a less soluble substance of unknown structure, thereby effecting precipitation. This less soluble material, for the purpose of convenience, will be hereafter referred to as a riboflavin precursor.

Such a process, based primarily on biochemical activity, for the precipitation of a product from which riboflavin can be obtained, as far as I am aware, has never before been known or utilized. A further and surprising feature of the present invention is the fact that precipitation occurs in new types of media, and best recoveries are obtained under conditions of temperature which are not optimum for growth of the bacteria. In addition to being obviously founded upon principles different from the methods employed by the prior art for recovering riboflavin from aqueous solutions or mixtures thereof, it will also be apparent that my process possesses many advantages over former methods, among which are the relatively short period of time required to recover the riboflavin in a form which is readily reconvertible into the yellow crystalline vitamin, as compared to prior art methods for treatment of such media having the same riboflavin concentration, the simple design of the equipment required, economy of operation, and avoidance of the use and recovery of large volumes of inflammable and expensive elution solvents.

Experimental evidence has established the fact that the aforesaid riboflavin precursor and riboflavin, per se, are quite dissimilar. The precipitate referred to and which contains the riboflavin precursor, is formed by the action of certain types of reducing bacteria on solutions containing riboflavin dissolved therein. The very fact that the necessary reducing conditions must be present in the solution before the precipitate can be secured is indicative, to say the least, that the dissolved riboflavin undergoes a chemical and not a physical transformation. Furthermore, the product thus obtained and which is relatively insoluble in the solution under the reducing conditions present therein, can not be converted into riboflavin by dissolving the former in a solvent for said precipitate unless air or oxygen is present. Such precipitate, when examined microscopically, is seen to be amorphous whereas riboflavin possesses a well defined crystalline structure. In the absence of oxygen the precipitate dissolves to produce a green solution from which no riboflavin precipitates, regardless of the length of time such solution is permitted to stand or the cooling conditions to which it may be subjected. Riboflavin is only obtained by shaking the green solution containing the dissolved riboflavin precursor in the presence of air. By such treatment the solution will be observed to turn from green to yellow and on standing yellow crystalline needles of riboflavin precipitate. The fact that the latter product can be obtained from the aforesaid green solution of riboflavin precursor only in the presence of air, is further evidence that a chemical reaction is involved, viz., oxidation in the transformation of the precursor to riboflavin and hence, it is likewise additional evidence that the precursor and riboflavin are different substances.

Although my invention may be employed to recover riboflavin from a wide variety of nutrient solutions or mixtures, it is particularly useful for recovering dissolved riboflavin present in the liquors resulting from the action of riboflavin-producing organisms on suitable nutrient mashes. Specific examples of such riboflavin-containing liquors are those obtained by the action of the fungus *Eremothecium ashbyii* on nutrient mashes, in accordance with the procedure described in copending application, U. S. Serial No. 434,901, filed March 16, 1942, said liquors being hereinafter designated as Medium I. In any event, it is to be specifically understood that the expressions "nutrient solutions" and "nutrient mashes" which appear in the disclosure as well as in certain of the appended claims, are to be construed as any mash or solution capable of sustaining active growth of the bacteria utilized.

Although my process is especially adapted to the recovery of riboflavin from nutrient solutions rich in this material, in general it may be said that riboflavin can be recovered from nutrient solutions in which the concentration thereof is as low as about 65 μg. per ml., at temperatures of about 30° C. It will, of course, be obvious that riboflavin may be recovered, in accordance with my invention, from nutrient solutions containing the same, in concentrations less than 65 μg. per ml., provided, prior to the use of my process the riboflavin content of said solution is increased to the aforesaid value by evaporation or any other convenient means. Likewise, it will be apparent that lower temperatures will favor precipitation of riboflavin from mashes which contain lower concentrations thereof.

In carrying out my invention, a medium containing dissolved riboflavin and the necessary nutrients is adjusted to a predetermined pH, after which the medium is brought to the desired temperature and inoculated with an active culture of bacteria capable of producing a precipitate from which riboflavin can be obtained. In the event, however, that the medium becomes contaminated with objectionable organisms prior to inoculation, it should be sterilized in the usual manner in order that consistently satisfactory results may be obtained.

Fermentation is allowed to continue until the separation of the precipitate is substantially complete. From this precipitate riboflavin can be recovered in amounts varying from about 50 to 92 per cent by weight of that originally in the solution. In general, however, this value will be found to constitute from about 80 to 92 per cent by weight of the riboflavin initially present. Such residues may be separated from the fermentation liquor in accordance with any convenient means, such as, for example, by decantation, centrifugation, or filtration. After isolation, the dried precipitate will usually be found to assay from 60 to 90 per cent riboflavin.

The riboflavin precursor present in the aforesaid precipitate can be readily converted into crystalline riboflavin by following the procedure described and claimed in copending application U. S. Serial No. 435,841, filed March 23, 1942 by Julian K. Dale. In accordance with the procedure there described the precipitate is added to a suitable solvent for the riboflavin precursor. The resulting mixture is then preferably heated to aid in solution of the crude product and upon such treatment the precipitate is substantially completely dissolved with the exception of a portion of the inert material present therein, which is removed from the hot solution by filtration or any other convenient means. The clear yellow solution thus obtained on cooling yields yellow needle-like crystals of riboflavin which may be readily separated from the mother liquor by filtration or centrifugation.

One of the principal factors in the procurement of satisfactory yields of riboflavin precursor by this method, is the establishment of the proper reducing conditions. This is tantamount to establishing a critical potential of the medium. Such a conclusion is based upon the observation that riboflavin-containing media of the type employed in the present invention when introduced into a cell having as one electrode a saturated calomel half cell and gold-plated platinum as the other electrode, precipitation did not occur after inoculation until a definite and reproducible potential had been established. In effect, there are two components which constitute the potential drop across the cell, i. e., the potential of the calomel half cell and the potential of the biological system in which precipitation occurs. It is understood, of course, that the potential of either of the above half cells will vary with the temperature, and also that any of the common standard reference electrodes may be used in place of the calomel half cell.

Generally, in order that the organism may be able to effect precipitation, the total potential as measured by the above-described cell should be at least as negative as −0.340 volt, as determined at 28° C. This value should be reached within a few hours after inoculation with 1 or 2 per cent of an active culture. Such measurement represents the total potential of the system, or, expressed otherwise, the potential of the cell chain. However, the potential of fundamental importance in my process is that which results from the potential difference across the interface existing between the gold-plated platinum electrode, mentioned above, and the cell solution, which in the present invention is a nutrient solution containing riboflavin. This potential may be represented by the symbol "$E_h$," the relationship of such a factor to the potential of the cell chain being expressed by the equation:

$$E_h = E_c + E_r$$

where $E_c$ represents the cell chain potential, and $E_r$ is the potential of the reference electrode, which in the present case is a saturated calomel half cell. Since the $E_r$ value of this reference electrode at 28° C., is +.244 volt, the $E_h$ value corresponding to an $E_c$ of −0.340 is −0.096 volt. This latter potential is produced as a result of the reducing action exerted by the bacteria on the substate, and therefore since an $E_h$ value of at least below about −0.096 volt is necessary to bring about precipitation, it may be said that any species of bacteria capable of producing an $E_h$ of the aforesaid value or below, in media of the type contemplated by the present invention, will be operative.

In connection with the desirability of maintaining a relatively low potential, at least during the early stages of the fermentation, it will be noted that carbohydrates should be present in nutritive amounts. In regard to the procurement of optimum conditions for the precipitation of riboflavin, it will also obviously be desirable to remove, or render inert to reducing conditions, substances present in the media in interfering amounts.

Generally, the initial pH of the medium may vary in value from about 4.2 to about 10.0. Where the medium is to be sterilized, however, it is preferable to employ a pH which is not in substantial excess of 6.5, since alkaline solutions of riboflavin are relatively unstable to heat. The preferred initial pH range, both from the standpoint of satisfactory precipitation and bacterial growth, for most types of media contemplated by the present invention, has been found to vary from about 5.5 to 7.5. An increase or decrease of the pH to the desired value in any event may be accomplished by the addition of the required amount of suitable acid or base. Representative examples of acids that may be employed for this purpose are hydrochloric acid, sulfuric acid, nitric acid, acetic acid, and the like. Alkaline materials suitable for this purpose are calcium carbonate, sodium carbonate, lime and the like.

Many bacteria may be utilized in carrying out my invention. Of the numerous types investigated by me, however, only those capable of reducing the $E_h$ of the solution, to a value of about $-0.096$, or below, have been found to be operative in my process. It has also been observed that mixed cultures of bacteria, which, as a group, are capable of producing an $E_h$ of the aforesaid value, may likewise be utilized in carrying out my invention. Typical species of bacteria which I have found to be capable of producing the above stated $E_h$ are Streptococcus faecalis, Streptococcus liquefaciens, Streptococcus cremoris, Streptococcus zymogenes, Streptococcus lactis, Eschericia coli, Clostridium acetobutylicum, Clostridium saccharo-butyl-acetonicum-liquefaciens, Clostridium saccharo-butyl-acetonicum-liquefaciens-delta, and Serratia plymouthensis. All of these bacteria possess the common property of acidulating the medium in which they are grown.

Although the bacteria which I may employ in general possess an optimum growth temperature of from about 30 to 37° C., I have found that precipitation of riboflavin may be obtained with temperatures ranging from approximately 8 to 47° C. Ordinarily, however, I prefer temperatures of from about 15 to 33° C.

The inoculant used in precipitating the riboflavin from nutrient mashes of the type contemplated by the present invention, may be prepared in accordance with any of several standard procedures. In general, although the inoculant employed may be only one generation removed from the stock culture, it should preferably be the second to fourth generation. Of course, in large-scale processes, the latter may readily be accomplished by the successive transfers required to build up the necessary volume of inoculant.

In recovering riboflavin from nutrient mashes by fermentation thereof with bacteria of the type set forth, certain precautions with regard to the amount of inoculant employed, should be observed. For example, although I have found that the per cent of riboflavin recovered does not vary appreciably with the proportion of inoculant employed, such a factor does influence the speed with which precipitation is commenced. Generally, the quantity of inoculant necessary to effect precipitation within a reasonably short period of time, should be from about 0.1 to 5 per cent by volume.

The specific examples which follow are illustrative of my invention:

EXAMPLE I

Medium I containing riboflavin in a concentration of 212 µg. per ml. was filtered, adjusted to a pH of 5.5 by addition of the necessary amount of concentrated sulfuric acid, and sterilized for 15 minutes at 15 pounds gauge pressure. The resulting mash was then cooled to 28° C., inoculated with 4 per cent of a third generation culture of Streptococcus faecalis, and incubated for 18 hours at 28° C., at the end of which time the fermented mash was centrifuged and the supernatant liquor found to contain 29 µg. per ml. A precipitate yielding 85.7 per cent of the total quantity of riboflavin originally present in solution was recovered.

EXAMPLE II

Medium I, containing riboflavin in a concentration of 294 µg. per ml., was adjusted to a pH of 6.5, and sterilized for 15 minutes at a gauge pressure of 15 pounds. The resulting mash was cooled to 37 C., inoculated with 5 per cent of a third generation culture of Streptococcus faecalis and incubated for 24 hours at 37 C., at the end of which time the mash was centrifuged. The resulting supernatant liquor was analyzed for riboflavin and found to contain 26 µg. per ml. A precipitated yielding riboflavin in an amount constituting 85.5 per cent by weight of the total quantity of riboflavin originally present was recovered.

EXAMPLE III

Medium I, containing 316 µg. of riboflavin per ml., was filtered and adjusted to a pH of 6.0. This mash was steamed for 30 minutes, cooled to 16° C. and immediately inoculated with 1 per cent of an active culture of Streptococcus faecalis, after which it was incubated at 16° C. for 22 hours. At the end of this period, the fermented mash was centrifuged and the supernatant liquor found to contain 23 µg. per ml. The resulting precipitate yielded riboflavin in an amount equal to 92.4 per cent by weight of the riboflavin originally present in solution.

EXAMPLE IV

Medium I, containing 212 µg. of riboflavin per ml., was filtered, adjusted to a pH of 6.0 by addition of the necessary amount of concentrated sulfuric acid and steamed for 30 minutes. The resulting mash was then cooled to 30° C., inoculated with 4 per cent of a third generation culture of Streptococcus cremoris and incubated for 24 hours at 30° C., at the end of which time the mash was centrifuged. The clear liquor thus obtained was analyzed and found to contain riboflavin in a concentration of 16 µg. per ml. The residue isolated by centrifugation yielded riboflavin in an amount corresponding to 68 per cent by weight of the total quantity originally present in solution.

EXAMPLE V

Medium I, containing riboflavin in a concentration of 212 µg. per ml., was inoculated with 4 per cent of a third generation culture of Streptococcus zymogenes, and fermented under the same conditions as set forth in Example IV. At the end of the 24-hour fermentation period, the fermented mash was treated as described in the foregoing examples, the supernatant liquor on analysis showing riboflavin to be present in a concentration of 28 µg. per ml. Riboflavin was secured from the residue, obtained by centrifugation, in an amount equal to 81.0 per cent by weight of the total quantity originally present in solution.

EXAMPLE VI

Medium I, containing riboflavin in a concentration of 177 μg. per ml., was filtered and brought to a pH of 5.5 by the addition of the necessary quantity of concentrated sulfuric acid. The mash was then steamed for a period of 30 minutes, after which it was cooled and inoculated with 4 per cent of a fourth generation culture of *Streptococcus liquefaciens*. The inoculated mash was then fermented under the same conditions as set forth in Example IV. At the end of the fermentation period and after centrifugation, the concentration of dissolved riboflavin had been reduced to 36 μg. per ml. The residue obtained by centrifuging the fermented mash yielded riboflavin in an amount corresponding to 75.2 per cent by weight of the total quantity originally present in solution.

EXAMPLE VII

A medium containing the following ingredients (concentrations expressed in grams per liter) was prepared: glucose, 5 grams; yeast extract, 10 grams; aspargine, 0.7 gram; $K_2HPO_4 \cdot 3H_2O$, 0.92 gram; $KH_2PO_4$, 0.7 gram; $MgSO_4 \cdot 7H_2O$, 0.28 gram; NaCl, 0.014 gram; $Mn\ SO_4 \cdot 4H_2O$, 0.014 gram; and $FeSO_4 \cdot 7H_2O$, 0.014 gram. To this medium was added riboflavin in a concentration of 150 μg. per ml. The resulting mixture was adjusted to a pH of 6.1 and then sterilized for 20 minutes at 15 pounds gauge pressure. The sterilized mass was cooled to 30 C., inoculated with 1 per cent of an active culture of *Clostridium saccharo-butyl-acetonicum - liquefaciens - delta* and incubated for 18 hours at 30° C. At the end of this period the fermented mash was centrifuged as previously described. The centrifuged liquor assayed 12 μg. of riboflavin per ml., while the residue, resulting from the same operation, yielded riboflavin in an amount equal to 80.4 per cent by weight of that originally in the unfermented mash.

The data appearing below in tabular form demonstrate typical $E_h$ values produced during the recovery of riboflavin from nutrient mashes in accordance with my invention. The mashes employed were those obtained by the process described and claimed in copending application U. S. Serial No. 434,901, filed March 16, 1942. According to the latter process, solutions rich in riboflavin are produced by fermenting a sterile mash containing, as the substrate, proteins and carbohydrates with an active culture of the fungus *Eremothecium ashbyii*, in the presence of abundant aeration. At the conclusion of the fermentation, the resulting mash is acidified and heated to insure substantially complete liberation of the synthesized riboflavin from the fungus cells, after which the mash is filtered. The filtrate thus obtained was used in securing the results shown below. In all cases the particular mash was adjusted to a pH of 6.0, steamed for 30 minutes, and then cooled to 30° C. The resulting mash was next inoculated with 1 per cent of an active culture of *Streptococcus faecalis* and incubated for 23 hours at 30° C.

Table

| Mash substrate | Riboflavin initially present, μg. per ml. | Riboflavin content of centrifuged liquor, μg. per ml. | Per cent by weight of riboflavin recovered | Lowest observed $E_h$ |
|---|---|---|---|---|
| Wheat middlings | 147 | 78 | 40.8 | −0.102 |
| Dried yeast | 188 | 38 | 67.5 | −0.0134 |
| Linseed oil meal | 124 | 62 | 52.4 | −0.154 |

It should be understood, of course, that the above examples are merely illustrative of my invention, and are to be in no way construed as limiting the scope thereof. On the contrary, the present invention is intended to cover methods for recovering riboflavin from nutrient solutions thereof involving the procurement of precipitates, from which riboflavin may be obtained, by fermenting said solutions with bacteria capable of producing an $E_h$ of about −0.096 volt.

This is a continuation-in-part of my copending application U. S. Serial No. 435,418, filed March 19, 1942.

My invention now having been described, what I claim is:

1. In a process for recovering riboflavin, the step which comprises inoculating a nutrient riboflavin-containing mash having a riboflavin concentration of at least 65 μg. per ml., with an active culture of bacteria, which synthesizes substantially no additional riboflavin in said mash and which is active to produce in said mash an $E_h$ value of at least as low as −0.096 volt, to yield a precipitate containing a riboflavin precursor.

2. In a process for recovering riboflavin, the steps which comprise inoculating a nutrient riboflavin-containing mash having a riboflavin concentration of at least 65 μg. per ml., with an active culture of bacteria, which synthesizes substantially no additional riboflavin in said mash and which is active to produce in said mash an $E_h$ value of at least as low as −0.096 volt, and fermenting said mash at a temperature of from 8 to 47° C., to yield a precipitate containing a riboflavin precursor.

3. In a process for recovering dissolved riboflavin from a nutrient mash having a riboflavin concentration of at least 65 μg. per ml., the steps which comprise adjusting the initial pH of such mash to a value ranging from about 4.2 to 10.0, inoculating said mash with an active culture of bacteria, which synthesizes substantially no additional riboflavin in said mash and which is active to produce in the mash an $E_h$ value of at least about −0.096 volt, and fermenting said mash at a temperature of from 8 to 47° C. to yield a precipitate containing a riboflavin precursor.

4. In a process for recovering dissolved riboflavin from a nutrient mash having a riboflavin concentration of at least 65 μg. per ml., the steps which comprise adjusting the initial pH of such mash to a value ranging from about 5.5 to 7.5, inoculating said mash with an active culture of bacteria, which synthesizes substantially no additional riboflavin in said mash and which is active to produce in the mash an $E_h$ value of at least about −0.096 volt, and fermenting said mash at a temperature of from 15 to 33° C. to yield a precipitate containing a riboflavin precursor.

5. In a process for recovering dissolved riboflavin from a nutrient mash having a riboflavin concentration of at least 65 μg. per ml., and which has been fermented by the organism *Eremothecium ashbyii*, the steps which comprise inoculating such mash with an active culture of bacteria, which synthesizes substantially no additional riboflavin in said mash and which is active to produce in said mash an $E_h$ value of at least as low as −0.096 volt, to yield a precipitate containing a riboflavin precursor.

6. In a process for recovering dissolved riboflavin from a nutrient mash having a riboflavin concentration of at least 65 μg. per ml., and which has been fermented by the organism *Eremothecium ashbyii*, the steps which comprise adjusting the initial pH of said mash to a value range from about 4.2 to 10.0, inoculating said mash with an active culture of bacteria, which synthesizes substantially no additional riboflavin in said mash and which is active to produce in the mash an $E_h$ value of at least about —0.096 volt, and fermenting said mash at a temperature of from 8 to 47° C. to yield a precipitate containing a riboflavin precursor.

7. In a process for recovering dissolved riboflavin from a nutrient mash having a riboflavin concentration of at least 65 µg. per ml., and which has been fermented by the organism *Eremothecium ashbyii*, the steps which comprise adjusting the initial pH of such mash to a value ranging from about 5.5 to 7.5, inoculating said mash with an active culture of bacteria, which synthesizes substantially no additional riboflavin in said mash and which is active to produce in the mash an $E_h$ value of at least about —0.096 volt, and fermenting said mash at a temperature of from 15 to 33° C. to yield a precipitate containing a riboflavin precursor.

8. In a process for recovering dissolved riboflavin from a nutrient mash having a riboflavin concentration of at least 65 µg. per ml., and which has been fermented by the organism *Eremothecium ashbyii*, the steps which comprise adjusting the initial pH of such mash to a value ranging from between about 4.2 to 10.0, inoculating said mash with an active culture of bacteria of the species *Streptococcus faecalis*, which synthesizes substantially no additionl riboflavin in the mash, and fermenting said mash at a temperature of from 8 to 47° C. to yield a precipitate containing a riboflavin precursor.

9. In a process for recovering dissolved riboflavin from a nutrient mash having a riboflavin concentration of at least 65 µg. per ml., and which has been fermented by the organism *Eremothecium ashbyii*, the steps which comprise adjusting the initial pH of such mash to a value ranging from between about 4.2 to 10.0, inoculating said mash with an active culture of bacteria of the species *Streptococcus zymogenes*, which synthesizes substantially no additional riboflavin in the mash, and fermenting said mash at a temperature of from 8 to 47° C. to yield a precipitate containing a riboflavin precursor.

10. In a process for recovering dissolved riboflavin from a nutrient mash having a riboflavin concentration of at least 65 µg. per ml., and which has been fermented by the organism *Eremothecium ashbyii*, the steps which comprise adjusting the initial pH of such mash to a value ranging from between about 4.2 to 10.0, inoculating said mash with an active culture of bacteria of the species *Streptococcus liquefaciens*, which synthesizes substantially no additional riboflavin in the mash, and fermenting said mash at a temperature of from 8 to 47° C. to yield a precipitate containing a riboflavin precursor.

11. In a process for recovering riboflavin, the step which comprises inoculating a nutrient riboflavin-containing mash having a riboflavin concentration of at least 65 µg. per ml. with a mixed culture of bacteria, which synthesizes substantially no additional riboflavin in said mash and which is active to produce in the mash an $E_h$ value of at least as low as —0.096 volt to yield a precipitate containing a riboflavin precursor.

12. A process for producing a precipitate from which riboflavin can be obtained, which comprises fermenting a nutrient riboflavin-containing mash having a riboflavin concentration of at least 65 µg. per ml., with a culture of bacteria, which synthesizes no additional riboflavin in the mash and which is active to produce in said mash an $E_h$ value of at least as low as —0.096 volt, to yield a precipitate containing a riboflavin precursor, removing the precipitate from the fermented mash and obtaining riboflavin in crystalline form from said precipitate.

13. In a process for recovering dissolved riboflavin from a nutrient mash having a riboflavin concentration of at least 65 µg. per ml., the steps which comprise adjusting the initial pH of such mash to a value ranging from between about 4.2 to 10.0, inoculating said mash with an active culture of acid-producing bacteria selected from the group consisting of *Streptococcus faecalis*, *Streptococcus liquefaciens*, *Streptococcus cremoris*, *Streptococcus zymogenes*, *Streptococcus lactus*, *Eschericia coli*, *Clostridium acetobutylicum*, *Clostridium saccharo-butyl-acetonicum - liquefaciens*, *Clostridium saccharo-butyl-acetonicum-liquefaciens-delta*, and *Serratia plymouthensis*, which synthesizes substantially no additional riboflavin in said mash and fermenting said mash at a temperature of about 8 to 47° C. to yield a riboflavin containing precipitate.

14. In a process for recovering dissolved riboflavin from a nutrient mash having a riboflavin concentration of at least 65 µg. per ml., the steps which comprise adjusting the initial pH of such mash to a value of between about 5.5 to 7.5, inoculating said mash with an active culture of acid-producing bacteria selected from the group consisting of *Streptococcus faecalis*, *Streptococcus liquefaciens*, *Streptococcus cremoris*, *Streptococcus zymogenes*, *Streptococcus lactis*, *Eschericia coli*, *Clostridium acetobutylicum*, *Clostridium saccharo - butyl - acetonicum - liquefaciens*, *Clostridium saccharo-butyl-acetonicum-liquefaciens-delta*, and *Serratia plymouthensis*, which synthesizes substantially no additional riboflavin in said mash and fermenting said mash at a temperature of about 15 to 33° C. to yield a riboflavin containing precipitate.

15. In a process for recovering riboflavin from a nutrient mash having a riboflavin concentration of at least 65 µg. per ml., and which has been fermented by the organism *Eremothecium ashbyii*, the steps which comprise inoculating said mash with an active culture of bacteria which synthesizes no additional riboflavin in said mash, to produce a riboflavin containing precipitate.

16. In a process for recovering dissolved riboflavin from a nutrient mash having a riboflavin concentration of at least 65 µg. per ml., and which has been fermented by the organism *Eremothecium ashbyii*, the steps which comprise adjusting the initial pH of such mash to a value ranging from between about 4.2 to 10.0, inoculating said mash with an active culture of acid-producing bacteria selected from the group consisting of *Streptococcus faecalis, Streptococcus liquefaciens, Streptococcus cremoris, Streptococcus zymogenes, Streptococcus lactis, Eschericia coli, Clostridium acetobutylicum, Clostridium saccharo-butyl-acetonicum-liquefaciens, Clostridium saccharo-butyl-acetonicum-liquefaciens-delta*, and *Serratia plymouthensis*, which synthesizes substantially no additional riboflavin in said mash, and fermenting said mash at a temperature of about 8 to 47° C. to yield a riboflavin containing precipitate.

17. In a process for recovering dissolved riboflavin from a nutrient mash having a riboflavin concentration of at least 65 µg. per ml., and which has been fermented by the organism *Eremothecium ashbyii*, the steps which comprise adjusting the initial pH of such mash to a value of between about 5.5 to 7.5, inoculating said mash with an active culture of acid-producing bacteria selected from the group consisting of *Streptococcus faecalis, Streptococcus liquefaciens, Streptococcus cremoris, Streptococcus zymogenes, Streptococcus lactis, Eschericia coli, Clostridium acetobutylicum, Clostridium saccharo-butyl-acetonicum-liquefaciens, Clostridium saccharo-butyl-acetonicum-liquefaciens-delta*, and *Serratia plymouthensis* which synthesizes substantially no additional riboflavin in said mash, and fermenting said mash at a temperature of about 15 to 33° C. to yield a riboflavin containing precipitate.

GEORGE E. HINES, Jr.